(12) United States Patent
Lin

(10) Patent No.: US 10,775,934 B2
(45) Date of Patent: Sep. 15, 2020

(54) OPTICAL TOUCH APPARATUS

(71) Applicant: inFilm Optoelectronic Inc., New Taipei (TW)

(72) Inventor: Chih-Hsiung Lin, New Taipei (TW)

(73) Assignee: inFilm Optoelectronic Inc., New Taipei (TW)

( * ) Notice: Subject to any disclaimer, the term of this patent is extended or adjusted under 35 U.S.C. 154(b) by 0 days.

(21) Appl. No.: 16/260,980

(22) Filed: Jan. 29, 2019

(65) Prior Publication Data

US 2019/0243510 A1 Aug. 8, 2019

(30) Foreign Application Priority Data

Feb. 5, 2018 (CN) .......................... 2018 1 0112652

(51) Int. Cl.
*G06F 3/042* (2006.01)
*G06F 3/041* (2006.01)

(52) U.S. Cl.
CPC ................................. *G06F 3/0421* (2013.01)

(58) Field of Classification Search
None
See application file for complete search history.

(56) References Cited

U.S. PATENT DOCUMENTS

2013/0167628 A1* 7/2013 Hull ...................... E21B 47/117
73/152.58
2017/0160871 A1* 6/2017 Drumm ................. G06F 3/0428

* cited by examiner

*Primary Examiner* — Carl Adams
(74) *Attorney, Agent, or Firm* — Rabin & Berdo, P.C.

(57) ABSTRACT

An optical touch apparatus includes a light source unit, an optical signal processing unit, and a position computation unit. The light source unit emits light beams and generates three reference light spots at different positions. The optical signal processing unit receives three pieces of reflected light information respectively reflected and propagated by the three reference light spots and analyzes the three pieces of reflected light information to correspondingly generate three pieces of optical analysis information, each of the three pieces of optical analysis information includes a piece of vibration wave information and a piece of vibration time point information, and the piece of vibration wave information includes a touch vibration wave. The position computation unit computes a piece of touch position information according to each of the pieces of light spot position information, each of the pieces of vibration time point information, and the piece of vibration wave velocity information.

9 Claims, 4 Drawing Sheets

OPTICAL TOUCH APPARATUS

CROSS-REFERENCE TO RELATED APPLICATION

This non-provisional application claims priority under 35 U.S.C. § 119(a) to Patent Application No. 201810112652.2 filed in China, P.R.C. on Feb. 5, 2018, the entire contents of which are hereby incorporated by reference.

BACKGROUND

Technical Field

The instant disclosure relates to a touch apparatus, and in particular, to an optical touch apparatus.

Related Art

A current conventional projection-type optical touch apparatus mainly consists of a light source, a video camera, and a processor. The light source can project a light beam onto a screen, and an area of the screen that is irradiated becomes an operation area. When an object is in the operation area, the object blocks a part of the light beam that is irradiated by the light source onto the screen to form an object shadow corresponding to the object on the screen, the video camera is used to capture the object, the object shadow, and an image of the operation area, and the processor reads an image of a contact point formed when the object contacts the object shadow, to analyze position information of the contact point in the image by using an image analysis technique.

Another conventional projection-type touch apparatus has an outer frame defining a detection area, the outer frame has a plurality of light emitting elements disposed on sidewalls thereof, a light homogenizing layer that is used to homogenize a light source generated by the light emitting elements, and a video camera disposed at a corner thereof and used to shoot the detection area, and the camera is electrically connected to a control apparatus for analyzing image positioning. When a user clicks and touches to enter the detection area, the light source is also blocked at a touch position, and at the same time, the video camera transmits a picture shot in the detection area to the control apparatus to perform image positioning and analyzing, to determine the touch position.

The two conventional projection-type touch apparatuses both use a light blocking manner to determine a touch position, and therefore, are easily influenced by other surrounding light beams, causing a problem of misjudgment. Furthermore, the conventional projection-type touch apparatuses also need to project a light source onto a flat surface, to avoid non-uniform light reflection and not to influence determining accuracy.

SUMMARY

In view of this, an embodiment provides an optical touch apparatus, including a light source unit, an optical signal processing unit, and a position computation unit. The light source unit emits light beams and generates three reference light spots at different positions. The optical signal processing unit is configured to receive three pieces of reflected light information reflected and propagated by the three reference light spots and analyze the three pieces of reflected light information to correspondingly generate three pieces of optical analysis information, each of the three pieces of optical analysis information includes a piece of vibration wave information and a piece of vibration time point information, the piece of vibration wave information includes a touch vibration wave, and the piece of vibration time point information refers to time points at which the touch vibration wave is propagated to reach each of the reference light spots. The position computation unit is electrically connected to the optical signal processing unit and configured to: receive each of the pieces of optical analysis information, obtain a piece of light spot position information of each of the reference light spots and a piece of vibration wave velocity information, the vibration wave velocity information referring to a propagation velocity of the touch vibration wave, and further compute a piece of touch position information according to each of the pieces of light spot position information, each of the pieces of vibration time point information, and the piece of vibration wave velocity information, the touch position information referring to a relative epicenter position that generates the touch vibration wave.

As above, the optical touch apparatus in this embodiment of the instant disclosure generates the three reference light spots through the light source unit. When a touch behavior occurs, the optical signal processing unit analyzes the reflected light information reflected and propagated by the three reference light spots, to obtain the time points at which the touch vibration wave generated by the touch is propagated to reach each of the reference light spots, and computes a touch position according to each time point, a wave velocity of the touch vibration wave, and the positions of the three reference light spots. Therefore, this embodiment of the instant disclosure can enhance determining accuracy of a position without being influenced by other surrounding light beams, and furthermore, is not limited to being used on a flat touch surface, thereby greatly enhancing practicability.

DETAILED DESCRIPTION

Figure 1:
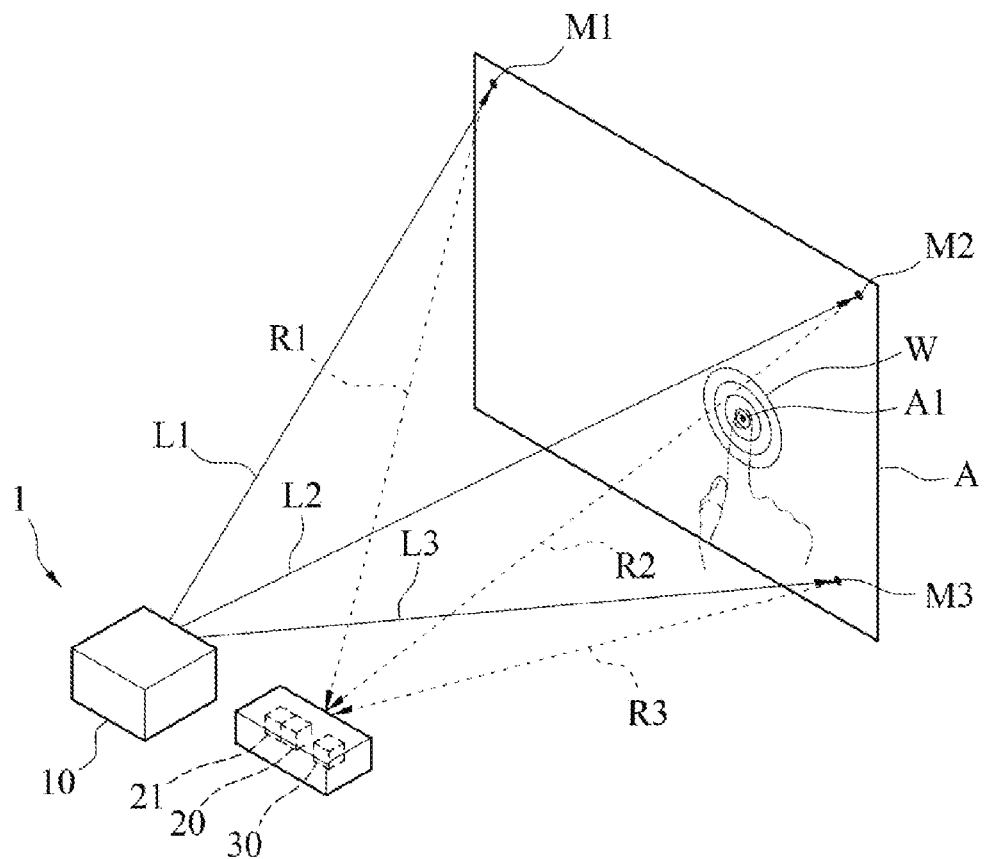
FIG. 1 is a schematic diagram of touching of an embodiment of the optical touch apparatus according to the instant disclosure.
Figure 2:
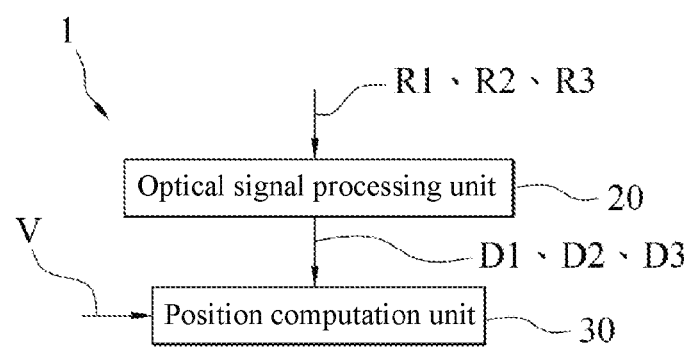
FIG. 2 is a block diagram of hardware of an embodiment of the optical touch apparatus according to the instant disclosure.

FIG. 1 is a schematic diagram of touching of an embodiment of the optical touch apparatus according to the instant disclosure, and FIG. 2 is a block diagram of hardware of an embodiment of the optical touch apparatus according to the instant disclosure. As shown in FIG. 1 and FIG. 2, in this embodiment, the optical touch apparatus 1 includes a light source unit 10, an optical signal processing unit 20, and a position computation unit 30.

In an embodiment, the light source unit 10 may be specifically a projection light source (for example, a laser unit, an infrared unit, or an ultraviolet unit), to emit a light beam to irradiate an object. For example, as shown in FIG. 1, the light source unit 10 may be a laser unit that emits a laser beam. In this embodiment, the light source unit 10 emits three laser beams L1, L2, and L3 to correspondingly irradiate an operation area A (for example, a desktop, a wall, a ground, or a screen) with a reflecting function and generate three reference light spots M1, M2, and M3 at different positions in the operation area A. In the embodiment in FIG. 1, the three reference light spots M1, M2, and M3 are respectively located at three corners of the operation area A, but embodiments are not limited thereto. The three reference light spots M1, M2, and M3 may be respectively located at any other positions in the operation area A. A user may perform a touch input in the operation area A.

In an embodiment, the optical signal processing unit 20 may be specifically a micro-processor, a micro-controller, a field programmable gate array, or a logic circuit. As shown in FIG. 1 and FIG. 2, in this embodiment, the optical signal processing unit 20 and the light source unit 10 are located at a same side of the operation area A, to receive three pieces R1, R2, and R3 of reflected light information respectively reflected and propagated by the three reference light spots M1, M2, and M3. As shown in FIG. 1, in an embodiment, the optical signal processing unit 20 may include a light-sensitive element 21, and for example, the light-sensitive element 21 may be a charge-coupled device (CCD), a complementary metal-oxide semiconductor (CMOS), a CMOS active pixel sensor, a photodiode, or a photoresistor, to receive the three pieces R1, R2, and R3 of reflected light information through the light-sensitive element 21.

Furthermore, as shown in FIG. 1 and FIG. 2, the optical signal processing unit 20 may analyze the three pieces R1, R2, and R3 of reflected light information to correspondingly generate three pieces D1, D2, and D3 of optical analysis information. Each of the three pieces D1, D2, and D3 of optical analysis information includes a piece of vibration wave information and a piece of vibration time point information, the vibration wave information includes a touch vibration wave W, and the piece of vibration time point information is time points at which the touch vibration wave W is propagated to reach each of the reference light spots M1, M2, and M3.

Figure 3:
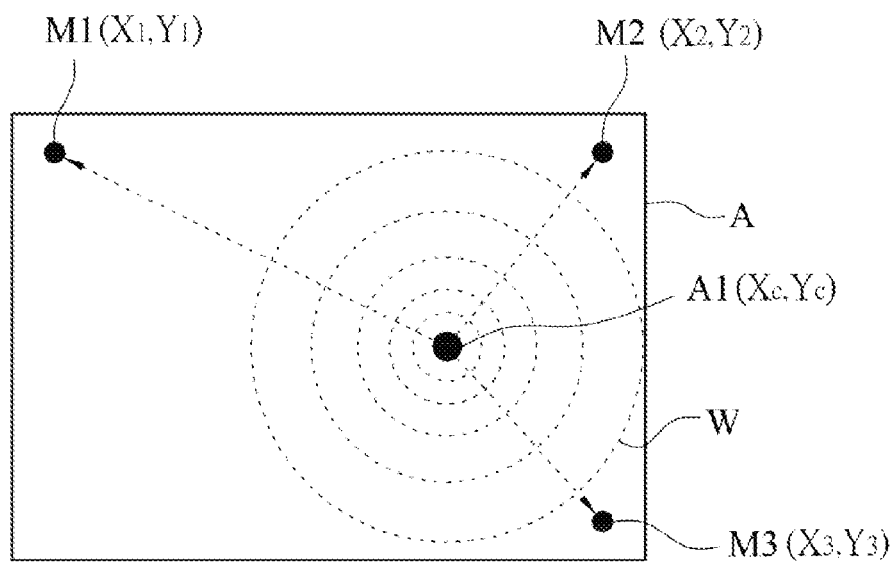
FIG. 3 is a schematic diagram of propagation of a touch vibration wave of an embodiment of the optical touch apparatus according to the instant disclosure.

Specifically, as shown in FIG. 1 and FIG. 3, when the user performs a touch input in the operation area A, a touched position in the operation area A generates a piece of vibration wave information. For example, in the embodiment in FIG. 1, the user contacts a position in the operation area A by a finger to form a touch point A1, the touch point A1 that is touched generates vibration wave information containing the touch vibration wave W. In specific, the touch vibration wave W is a vibration wave generated when an object is touched, and the touch vibration wave W is gradually diffused in all directions. When it is assumed that the surface of the operation area A is a uniform flat surface, the touch vibration wave W is uniformly diffused and propagated in all directions by using the touch point A1 as a center. Therefore, as shown in FIG. 3, the touch vibration wave W is propagated toward each of the reference light spots M1, M2, and M3. When the touch vibration wave W is respectively propagated to reach each of the reference light spots M1, M2, and M3, the vibration wave information is transmitted to the optical signal processing unit 20 along with the pieces R1, R2, and R3 of reflected light information reflected and propagated by each of the reference light spots M1, M2, and M3, and the optical signal processing unit 20 may respectively analyze each of the pieces R1, R2, and R3 of reflected light information carrying the vibration wave information and take the touch vibration wave W in the vibration wave information and the time points at which the touch vibration wave W is respectively propagated to reach each of the reference light spots M1, M2, and M3.

In the embodiment in FIG. 1 and FIG. 3, since distances between each of the reference light spots M1, M2, and M3 and the touch point A1 are different, the time points at which the touch vibration wave W is respectively propagated to reach each of the reference light spots M1, M2, and M3 are also different. As shown in FIG. 3, in this embodiment, since, compared with the reference light spot M2, the reference light spot M1 is far away from the touch point A1, a time point at which the touch vibration wave W is propagated to reach the reference light spot M1 is later than a time point at which the touch vibration wave is propagated to reach the reference light spot M2.

The optical signal processing unit 20 may learn that the pieces R1, R2, and R3 of reflected light information carry the vibration wave information in the following manner, to obtain the vibration wave information contained in each pieces D1, D2, and D3 of optical analysis information. For example, in an embodiment, the touch vibration wave W is in a frequency domain that is different from a frequency domain of laser beams L1, L2, and L3. For example, the laser beams L1, L2, and L3 emitted by the light source unit 10 are at a high frequency (for example, from 3 MHz to 300 MHz), the frequency domain of the touch vibration wave W may be a low frequency domain (for example, below 3 KHz). However, the foregoing frequency values are only examples, but embodiments are not limited thereto, and the low frequency may range from 3 KHz to 30 KHz, 300 Hz to 3 KHz, or 30 Hz to 300 Hz. The optical signal processing unit 20 may recognize the pieces R1, R2, and R3 of reflected light information carrying the touch vibration wave W according to a difference between a frequency domain of the touch vibration wave W and a frequency domain of the laser beams L1, L2, and L3. The frequency domain of the touch vibration wave W and the frequency domain of the laser beams L1, L2, and L3 are only examples. Actually, the touch vibration wave W and the laser beams L1, L2, and L3 can be recognized provided that they belong to different frequency domains. For example, the frequency domain of the touch vibration wave W may be a low frequency (LF), a very low frequency (VLF), an ultra low frequency (ULF), or a super low frequency (SLF), and the frequency domain of the projection light L1 may be a medium frequency (MF), a high frequency (HF), a very high frequency (VHF), an ultra high frequency (UHF), or a super high frequency (SHF), but embodiments are not limited thereto.

In another embodiment, the light source unit 10 may also be an optical modulation unit that modulates the emitted laser beams L1, L2, and L3 to be modulation light beams (modulation lighting). For example, the laser beams L1, L2, and L3 may be high-frequency signal light beams between 3 MHz and 300 MHz, the pieces R1, R2, and R3 of reflected light information reflected and propagated by each of the reference light spots M1, M2, and M3 are correspondingly modulated reflected light information (carrying the vibration wave information), and the optical signal processing unit 20 may demodulate the pieces of modulated reflected light information according to a Fourier transformation, to generate the pieces D1, D2, and D3 of optical analysis information. Furthermore, since the laser beams L1, L2, and L3 and the pieces R1, R2, and R3 of reflected light information are modulation signal light beams, they may be prevented from being interfered with other surrounding light beams having other frequency signals, so that the optical signal processing unit 20 can analyze and generate the pieces D1, D2, and D3 of optical analysis information more accurately and rapidly.

Alternatively, in an embodiment, the optical signal processing unit 20 may also obtain a piece of laser spot information according to each of the pieces R1, R2, and R3 of reflected light information and correspondingly obtain the vibration wave information in each of the pieces D1, D2, and D3 of optical analysis information through analyzing the laser spot information. For example, the optical signal processing unit 20 may be a laser analyzer to analyze each piece of laser spot information, to obtain a period, a wavelength, an amplitude, a frequency, a phase, or a combination thereof of a laser spot generated correspondingly when the laser beams L1, L2, and L3 irradiate the operation area A. The optical signal processing unit 20 may recognize the pieces R1, R2, and R3 of reflected light information carrying the touch vibration wave W according to a difference between the touch vibration wave W and the period, wavelength, amplitude, frequency, phase, or a combination thereof of the laser spot.

As shown in FIG. 1 to FIG. 3, the position computation unit 30 may be specifically a micro-processor, a micro-controller, a field programmable gate array, or a logic circuit. The position computation unit 30 is eclectically connected to the optical signal processing unit 20 to receive the pieces D1, D2, and D3 of optical analysis information analyzed by the optical signal processing unit 20. The position computation unit 30 further obtains light spot position information $(X_1, Y_1)$, $(X_2, Y_2)$, and $(X_3, Y_3)$ of each of the reference light spots M1, M2, and M3 and vibration wave velocity information V, and the vibration wave velocity information V refers to a propagation velocity of the touch vibration wave W. For example, as shown in FIG. 3, when a position in the operation area A is touched, the touch vibration wave W is generated and is propagated in all directions by using the operation area A as a medium, the vibration wave velocity information V is a wave velocity (for example, five meters per second, ten meters per second, or fifteen meters per second) of propagation of the touch vibration wave W and may be different according to a material of the operation area A (for example, a desktop, a wall, a ground, or a screen). In some embodiments, the vibration wave velocity information V may be built in the position computation unit 30 or input into the position computation unit 30 from the outside (as shown in FIG. 2), but embodiments are not limited thereto.

In some embodiments, the position computation unit 30 may obtain light spot position information $(X_1, Y_1)$, $(X_2, Y_2)$, and $(X_3, Y_3)$ of each of the reference light spots M1, M2, and M3 in the following manner. As shown in FIG. 1 to FIG. 3, the optical signal processing unit 20 may analyze the three pieces R1, R2, and R3 of reflected light information respectively reflected and propagated by the three reference light spots M1, M2, and M3, and then learns the positions of the three reference light spots M1, M2, and M3 to obtain the light spot position information $(X_1, Y_1)$, $(X_2, Y_2)$, and $(X_3, Y_3)$ and transmit the light spot position information $(X_1, Y_1)$, $(X_2, Y_2)$, and $(X_3, Y_3)$ to the position computation unit 30, so that the position computation unit 30 may obtain the light spot position information $(X_1, Y_1)$, $(X_2, Y_2)$, and $(X_3, Y_3)$ of the three reference light spots M1, M2, and M3.

Figure 4:
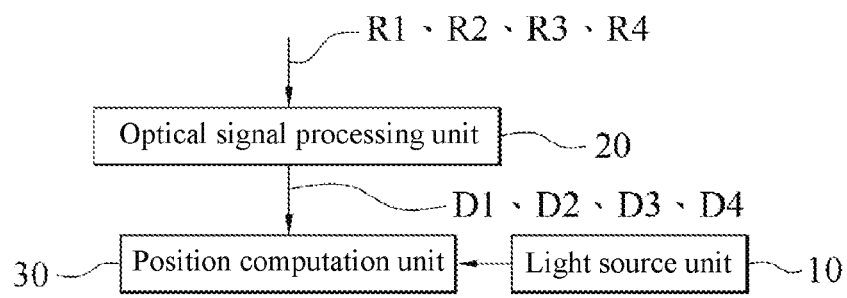
FIG. 4 is a block diagram of hardware of another embodiment of the optical touch apparatus according to the instant disclosure.

Alternatively, as shown in FIG. 4, in another embodiment, the position computation unit 30 may be electrically connected to the light source unit 10, and the light spot position information $(X_1, Y_1)$, $(X_2, Y_2)$, and $(X_3, Y_3)$ obtained by the position computation unit 30 are transmitted by the light source unit 10. Specifically, a position of the operation area A onto which a light beam is irradiated may be determined by the light source unit 10 by default. For example, in an embodiment in FIG. 1, directions and angles of the three laser beams L1, L2, and L3 emitted by the light source unit 10 may be determined in advance, so that the three laser beams L1, L2, and L3 are correspondingly irradiated onto the predetermined positions in the operation area A to form the three reference light spots M1, M2, and M3. Therefore, the light source unit 10 may obtain light spot position information $(X_1, Y_1)$, $(X_2, Y_2)$, and $(X_3, Y_3)$ of the three reference light spots M1, M2, and M3 in advance and transmit the light spot position information $(X_1, Y_1)$, $(X_2, Y_2)$, and $(X_3, Y_3)$ to the position computation unit 30.

Furthermore, as shown in FIG. 1 to FIG. 3, the position computation unit 30 may compute touch position information $(X_c, Y_c)$ according to the light spot position information $(X_1, Y_1)$, $(X_2, Y_2)$, and $(X_3, Y_3)$, and information of vibration time points at which the touch vibration wave W is respectively propagated to reach each of the reference light spots M1, M2, and M3, and vibration wave velocity information V. As shown in FIG. 3, the touch position information $(X_c, Y_c)$ refers to a relative epicenter position (that is, the position of the touch point A1) generating the touch vibration wave W. A computation manner of the touch position information $(X_c, Y_c)$ is described as follows with reference to the drawings.

As shown in FIG. 1 to FIG. 3, according to the description in the foregoing embodiment, the position computation unit 30 may respectively obtain the light spot position information $(X_1, Y_1)$, $(X_2, Y_2)$, and $(X_3, Y_3)$ of the three reference light spots M1, M2, and M3 and the vibration wave velocity information V of the touch vibration wave W, and when the touch behavior occurs (for example, the user contacts a position in the operation area A by a finger to form the touch point A1), the optical signal processing unit 20 may analyze the three pieces R1, R2, and R3 of reflected light information respectively reflected and propagated by the three reference light spots M1, M2, and M3 to obtain the time points at which the touch vibration wave W is propagated to reach each of the reference light spots M1, M2, and M3. For example, the time point at which the touch vibration wave W is propagated to reach the reference light spot M1 is $T_1$, the time point at which the touch vibration wave W is propagated to reach the reference light spot M2 is $T_2$, and the time point at which the touch vibration wave W is propagated to reach the reference light spot M3 is $T_3$. Accordingly, it is assumed that a touch time point of the touch point A1 is $T_c$, and it is known that the distances between the touch point A1 $(X_c, Y_c)$ and the position information $(X_1, Y_1)$, $(X_2, Y_2)$, and $(X_3, Y_3)$ of the three light spots, and the vibration wave velocity information V have the following relationships in the three equations.

$$(T_1 - T_c) \times V = \sqrt{(X_1 - X_c)^2 + (Y_1 - Y_c)^2}$$

$$(T_2 - T_c) \times V = \sqrt{(X_2 - X_c)^2 + (Y_2 - Y_c)^2}$$

$$(T_3 - T_c) \times V = \sqrt{(X_3 - X_c)^2 + (Y_3 - Y_c)^2}$$

$(X_1, Y_1)$, $(X_2, Y_2)$, and $(X_3, Y_3)$ and V are all known numbers and $T_1$, $T_2$, and $T_3$ are known time points. Therefore, solutions of the three unknown numbers $T_c$, $X_c$, and $Y_c$ can be obtained according to the foregoing three simultaneous equations, so as to obtain the touch point A1 ($X_c$, $Y_c$) through computation. For example, in an embodiment, if assuming that $T_c$ is a certain time point, approximate solutions of $X_c$ and $Y_c$ may be obtained by using an iterative operation according to the method of least square, so as to obtain the touch point A1 ($X_c$, $Y_c$).

The following describes an example of a computation method in which the three simultaneous equations use the method of least square. It is assumed that the touch time point of the touch point A1 is $T_c$ and the time for propagating the touch vibration wave W is $t_i(X, Y)$, and it can be known through theoretical computation that, the measured time for an $i^{th}$ reference light spot M1, M2, and M3 should be $\pi_i = t_i(X, Y) + T_c$, where $$t_i(X, Y) = \frac{\sqrt{(X - X_i)^2 + (Y - Y_i)^2}}{V}$$

The theoretical computation and the actual measurement have a following error value $res_i$:

$$res_i = T_i - \pi_i c_i - t_i(x,y) \quad (1)$$

$c_i$ is an actually measured transmission time for respectively propagating the touch vibration wave W to the reference light spots M1, M2, and M3, and according to the computation manner of the method of least square, $X = x + dx$, $Y = y + dy$, $c = t + dt$ are substituted into the foregoing formula (1), then the formula (1) is rewritten as a Taylor expansion to be arranged as the following formula:

$$res_i = dt + \frac{\partial t_i(x, y)}{\partial x} dx + \frac{\partial t_i(x, y)}{\partial y} dy, \quad (2)$$

where $$\frac{\partial t_i(x, y)}{\partial x} = \frac{(x - x_i)}{V} \frac{1}{\sqrt{(x - x_i)^2 + (y - y_i)^2}} = a_i;$$

and $$\frac{\partial t_i(x, y)}{\partial y} = \frac{(y - y_i)}{V} \frac{1}{\sqrt{(x - x_i)^2 + (y - y_i)^2}} = b_i$$

The foregoing formula (2) is treated by using the method of least square, making:

$$f(x, y) = \sum_{i=1}^{3} res_i^2 = \sum_{i=1}^{3} \left( dt + \frac{\partial t_i(x, y)}{\partial x} dx + \frac{\partial t_i(x, y)}{\partial y} dy \right)^2$$

To minimize the error value, $$\frac{\partial f(x, y)}{\partial x} = 0, \frac{\partial f(x, y)}{\partial y} = 0, \frac{\partial f(x, y)}{\partial t} = 0 \quad (3)$$

The foregoing formula (3) is substituted into $f(x,y)$ to obtain three equation sets which are rewritten as a matrix form:

$$\begin{bmatrix} \sum_{i=1}^{3} a_i^2 & \sum_{i=1}^{3} a_i b_i & \sum_{i=1}^{3} a_i \\ \sum_{i=1}^{3} a_i b_i & \sum_{i=1}^{3} b_i^2 & \sum_{i=1}^{3} b_i \\ \sum_{i=1}^{3} a_i & \sum_{i=1}^{3} b_i & 3 \end{bmatrix} \begin{bmatrix} dx \\ dy \\ dt \end{bmatrix} = \begin{bmatrix} \sum_{i=1}^{3} res_i a_i \\ \sum_{i=1}^{3} res_i b_i \\ \sum_{i=1}^{3} res_i \end{bmatrix} \quad (4)$$

Suitable numbers $x = x_0$, $y = y_0$, and $t = t_0$ are selected to substitute into the foregoing formula (4), $res_i$ is substituted into the value of the foregoing formula (1), and the values of dx, dy, and dt can be computed, then, $x = x_1 = x_0 + dx$, $y = y_1 = y_0 + dy$, $t = t_1 = t_0 + dt$ are substituted into the formula (4) to compute new values of dx, dy, and dt, iteration is repeated till $\sqrt{dx^2 + dy^2} < m$, in which m is an order of magnitude of the error after the computation formula is converged, and an approximate value of a coordinate of the touch point A1 ($X_c$, $Y_c$) is finally obtained.

In an actual example, as shown in FIG. 3, it is assumed that a coordinate of an unknown touch point A1 ($X_c$, $Y_c$) is (2, 7), the known light spot position information ($X_1$, $Y_1$), ($X_2$, $Y_2$), and ($X_3$, $Y_3$) of the three reference light spots M1, M2, and M3 is respectively (0, 8), (10, 8), and (10, 0), the time points $T_1$, $T_2$, and $T_3$ at which the touch vibration wave W is propagated to reach each of the reference light spots M1, M2, and M3 are respectively 3 hours, 5 minutes, and 10.063 seconds, 3 hours, 5 minutes, and 9.224 seconds, and 3 hours, 5 minutes, and 9.806 seconds, and the vibration wave velocity information V is 10 mm/s. Firstly, the coordinate of the touch point A1 ($X_c$, $Y_c$) may be guessed to be (5, 4), for example, the guessed coordinate may be a coordinate that maintains a same distance from ($X_1$, $Y_1$), ($X_2$, $Y_2$), and ($X_3$, $Y_3$) respectively, and it is assumed that the touch time point $T_c$ is 3 hours, 5 minutes, and 8 seconds. Therefore, the propagation time for propagating the touch vibration wave W to the reference light spot M1 is 1.224 seconds, the propagation time for propagating the touch vibration wave W to the reference light spot M2 is 1.806 seconds, and the propagation time for propagating the touch vibration wave W to the reference light spot M3 is 2.063 seconds, the guessed value is substituted into the foregoing formulas (1) to (3), and the following parameters are calculated:

$$\begin{cases} res_1 = 0.6297 \\ res_2 = -0.2093 \\ res_3 = 0.3727 \end{cases}, \begin{cases} a_1 = -0.0781 \\ a_2 = 0.0781 \\ a_3 = -0.0781 \end{cases}, \begin{cases} b_1 = 0.0625 \\ b_2 = -0.0625 \\ b_3 = -0.0625 \end{cases}$$

The foregoing parameters are substituted into the formula (4) to obtain:

$$\begin{bmatrix} 0.0183 & -0.0049 & -0.0781 \\ -0.0049 & 0.0117 & -0.0625 \\ -0.0781 & -0.0625 & 3 \end{bmatrix} \begin{bmatrix} dx \\ dy \\ dt \end{bmatrix} = \begin{bmatrix} -0.0946 \\ 0.0291 \\ 0.7931 \end{bmatrix}$$

The simultaneous equations are solved to obtain dx=3.7266, dy=2.0570, and dt=0.2102, thereby obtaining a coordinate point that is (x+dx, y+dy)=(5−3.7266, 4+2.0570) =(1.2734, 6.0570). After (1.2734, 6.0570) is substituted into the formula to perform an iterative operation, a new coordinate point (2.1818, 7.0058) is obtained again, and the coordinate point (2.1818, 7.0058) is slightly different from the coordinate (2, 7) of the touch point A1 ($X_c$, $Y_c$), a coordinate point (2.0036, 7.0016) is obtained after performing the iterative operation for many times, and when a change of the coordinate point is less than 0.0001 if the iterative operation is continued to be performed, a final coordinate point (2.0036, 7.0016) that is different from the coordinate (2, 7) of the touch point A1 ($X_c$, $Y_c$) by being less than 1% is obtained.

In view of the above, the optical touch apparatus 1 in this embodiment of the instant disclosure generates the three reference light spots M1, M2, and M3 through the light source unit 10. When a touch behavior occurs, the optical signal processing unit 20 analyzes the reflected light information R1, R2, and R3 reflected and propagated by the three reference light spots M1, M2, and M3, to obtain the time points at which the touch vibration wave W generated by the touch is propagated to reach each of the reference light spots M1, M2, and M3, and computes a touch position ($X_c$, $Y_c$) according to each time point, a wave velocity of the touch vibration wave W, and the positions ($X_1$, $Y_1$), ($X_2$, $Y_2$), and ($X_3$, $Y_3$) of the three reference light spots M1, M2, and M3. Therefore, compared with a conventional method of determining a touch point by using a light blocking manner, this embodiment of the instant disclosure can enhance determining accuracy of a touch position without being influenced by other surrounding light beams, and furthermore, is not limited to being used on a flat touch surface, thereby greatly enhancing practicability.

Figure 5:
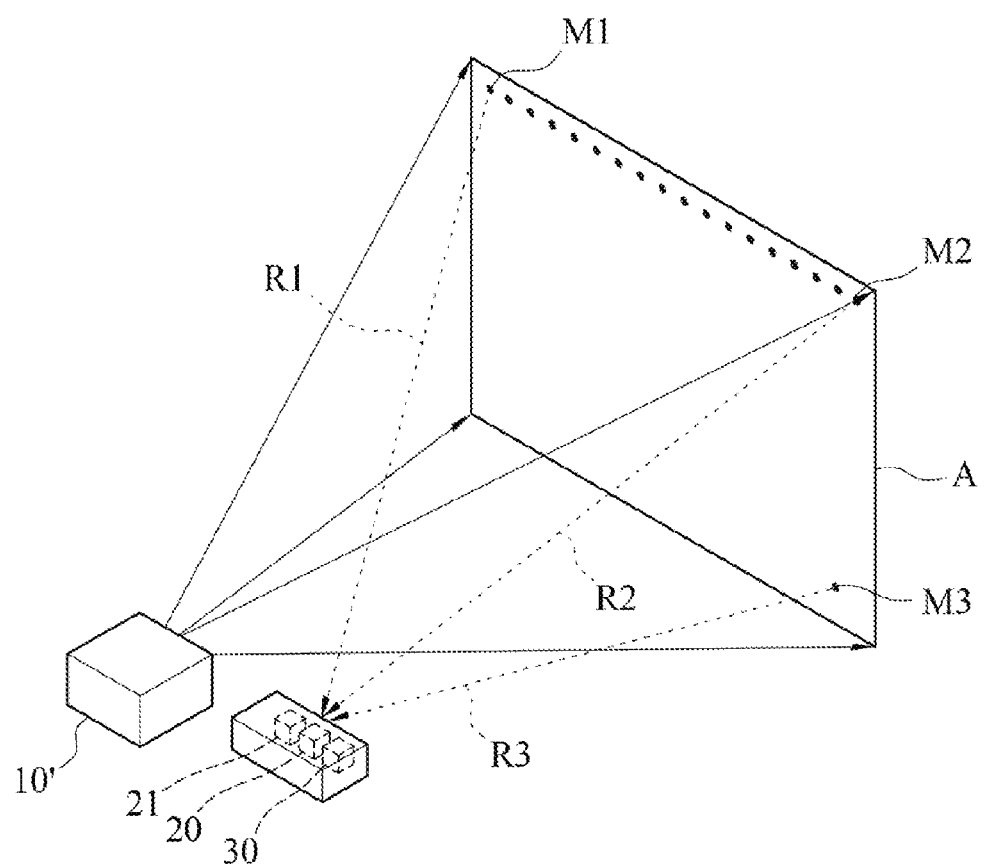
FIG. 5 is a schematic diagram of irradiation of an embodiment of the optical touch apparatus according to the instant disclosure.

FIG. 5 is a schematic diagram of irradiation of another embodiment of the optical touch apparatus according to the instant disclosure. This embodiment is different from the embodiment in FIG. 1 in that, a light source unit 10' is a projection light source, for example, a light-emitting diode (LED) or another light source (for example, a halogen lamp or an infrared lamp), or the light source unit 10' may also be a projector (for example, an LED pico projector or a laser pico projector) to emit a projection light beam to correspondingly project the whole operation area A and generate a plurality of light spots in the operation area A, and the optical signal processing unit 20 may selectively receive the three pieces R1, R2, and R3 of reflected light information reflected and propagated by at least three light spots (herein are reference light spots M1, M2, and M3), so as to perform analysis.

Figure 6:
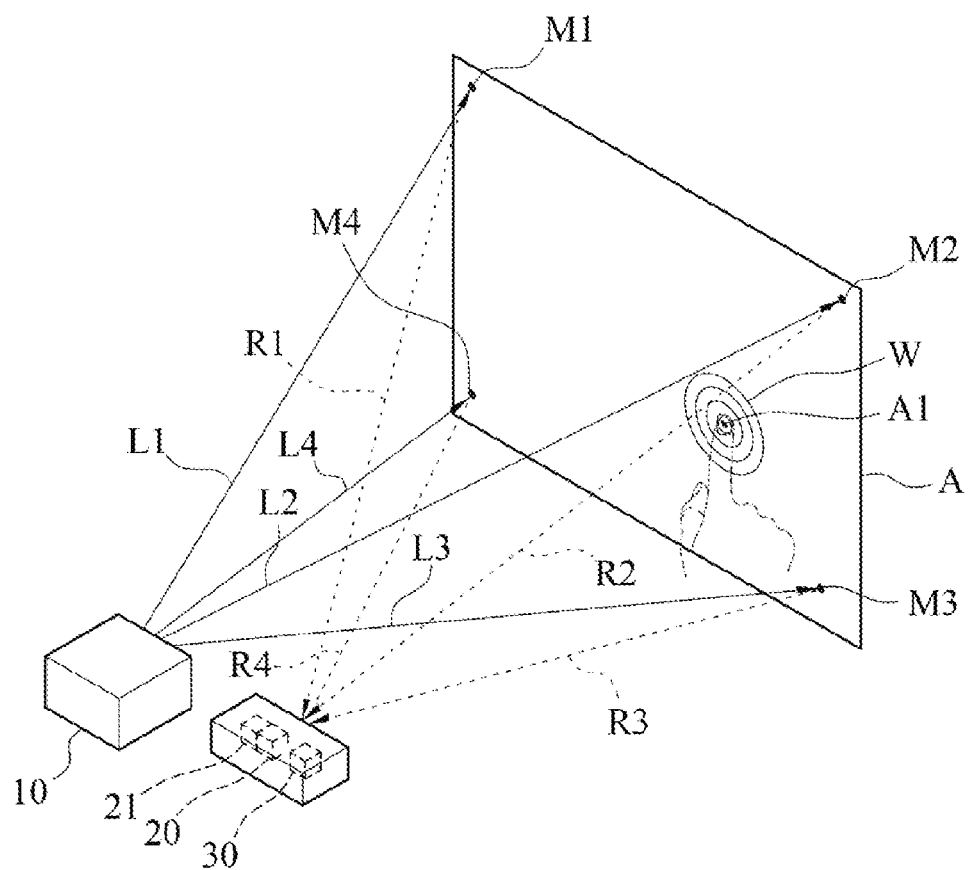
FIG. 6 is a schematic diagram of irradiation of another embodiment of the optical touch apparatus according to the instant disclosure.
Figure 7:
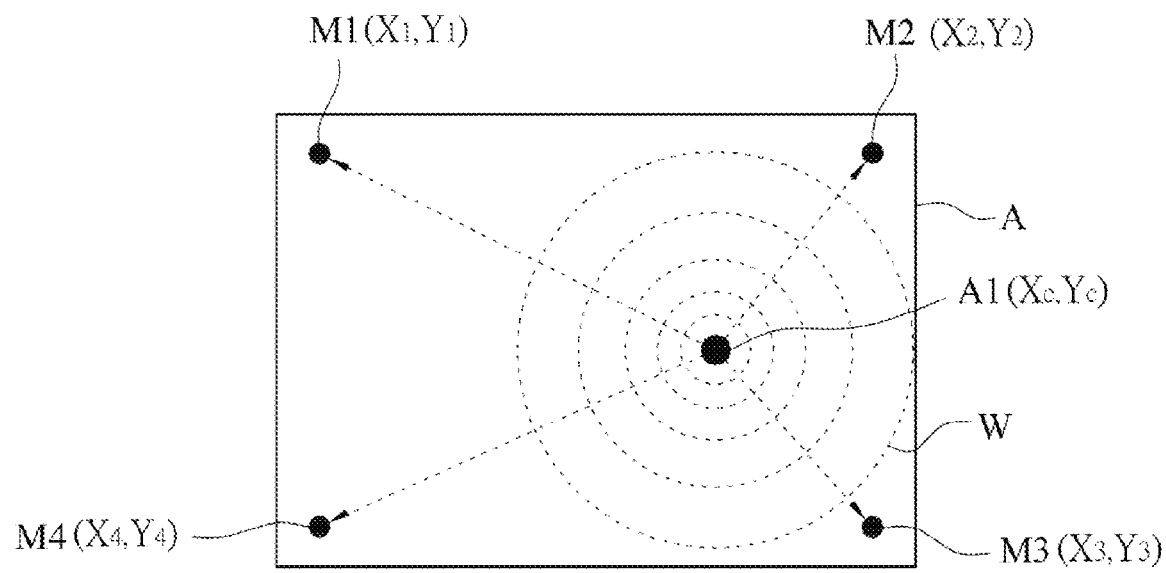
FIG. 7 is a schematic diagram of propagation of a touch vibration wave of another embodiment of the optical touch apparatus according to the instant disclosure.

FIG. 6 and FIG. 7 are a schematic diagram of irradiation and a schematic diagram of propagation of a touch vibration wave of another embodiment of the optical touch apparatus according to the instant disclosure. This embodiment is different from the embodiment in FIG. 1 in that, the light source unit 10 may also emit more than three laser beams to generate more light spots. For example, in this embodiment, the light source unit 10 emits four laser beams L1, L2, L3, and L4 to correspondingly irradiate four corners of the operation area A and generate three reference light spots M1, M2, and M3 and an auxiliary light spot M4 at different positions (herein are four corners) in the operation area A. The optical signal processing unit 20 further receives a piece R4 of auxiliary reflected light information reflected and propagated by the auxiliary light spot M4, analyzes the piece R4 of auxiliary reflected light information to correspondingly generate a piece D4 of auxiliary optical analysis information, and transmits the piece D4 of auxiliary optical analysis information to the position computation unit 30 (as shown in FIG. 4). The piece D4 of auxiliary optical analysis information includes vibration wave information and time point information, and the time point information refers to a time point at which the touch vibration wave W is propagated to reach the auxiliary light spot M4. That is, the optical signal processing unit 20 not only analyzes the pieces R1, R2, and R3 of reflected light information to obtain time points at which the touch vibration wave W is respectively propagated to reach each of the reference light spots M1, M2, and M3, but also analyzes the piece R4 of auxiliary reflected light information to obtain a time point at which the touch vibration wave W is propagated to reach the auxiliary light spot M4.

Furthermore, the position computation unit 30 may obtain position information ($X_4$, $Y_4$) of the auxiliary light spot M4 synchronously and computes touch position information ($X_c$, $Y_c$) according to the auxiliary optical analysis information and the position information ($X_4$, $Y_4$). That is, the position computation unit 30 may obtain information of four light spots (three reference light spots M1, M2, and M3 and an auxiliary light spot M4) (including position information, time points at which the touch vibration wave W is propagated to reach each of the light spots, and a wave velocity of the touch vibration wave W).

In an embodiment, the position computation unit 30 computes first touch position information ($X_c$, $Y_c$) according to the light spot position information ($X_1$, $Y_1$), ($X_2$, $Y_2$), and ($X_3$, $Y_3$) of the foregoing three reference light spots M1, M2, and M3, the information of the vibration time points at which the touch vibration wave W is respectively propagated to reach each of the reference light spots M1, M2, and M3, and the vibration wave velocity information V, and further performs a verification action through the information of the auxiliary light spot M4. For example, the position computation unit 30 may further compute second touch position information ($X_c$, $Y_c$) based on the information of the reference light spots M1 and M2 and the auxiliary light spot M4, so as to perform comparison and verification with the first touch position information ($X_c$, $Y_c$), thereby further enhancing the computation accuracy of the touch position.

In another embodiment, the position computation unit 30 may also take information of three different light spots to compute the touch position information ($X_c$, $Y_c$) for many times, for example, the position computation unit 30 may compute the first touch position information ($X_c$, $Y_c$) based on the information of the three reference light spots M1, M2, and M3, the second touch position information ($X_c$, $Y_c$) based on the information of the reference light spots M1 and M2 and the auxiliary light spot M4, and the third touch position information ($X_c$, $Y_c$) based on the information of the reference light spots M2 and M3 and the auxiliary light spot M4. Furthermore, the position computation unit 30 performs interactive comparison and determining on the foregoing multiple pieces of computed touch position information ($X_c$, $Y_c$) to output the final touch position information ($X_c$, $Y_c$), to further enhance computation accuracy of the touch position. For example, it is assumed that the multiple pieces of touch position information ($X_c$, $Y_c$) computed by the position computation unit 30 are the same, and the position computation unit 30 may select one piece as final touch position information ($X_c$, $Y_c$). It is assumed that the multiple pieces of touch position information ($X_c$, $Y_c$) computed by the position computation unit 30 have small differences, and the position computation unit 30 can take a relative center point of the multiple pieces of touch position information ($X_c$, $Y_c$) as final touch position information ($X_c$, $Y_c$).

Although the instant disclosure has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An optical touch apparatus, comprising:
a light source unit, configured to emit three light beams at different angles to correspondingly irradiate a surface of an operation area and generate three reference light spots at different positions, wherein the operation area has a reflection function but no light guide function;
an optical signal processing unit, configured to receive three pieces of reflected light information reflected and propagated by the three reference light spots from the operation area and analyze the three pieces of reflected light information to correspondingly generate three pieces of optical analysis information, wherein each of the three pieces of optical analysis information comprises a piece of vibration wave information and a piece of vibration time point information, the piece of vibration wave information comprises a touch vibration wave, and the piece of vibration time point information refers to time points at which the touch vibration wave is propagated to reach each of the reference light spots; and
a position computation unit, electrically connected to the optical signal processing unit and configured to: receive the pieces of optical analysis information, obtain a piece of light spot position information of each of the reference light spots and a piece of vibration wave velocity information, the vibration wave velocity information referring to a propagation velocity of the touch vibration wave, and further compute a piece of touch position information according to the pieces of light spot position information, the pieces of vibration time point information, and the piece of vibration wave velocity information, the touch position information referring to a relative epicenter position that generates the touch vibration wave.

2. The optical touch apparatus according to claim 1, wherein the light source unit is a laser unit that correspondingly emits three laser beams to generate the three reference light spots.

3. The optical touch apparatus according to claim 2, wherein the position computation unit is electrically connected to the light source unit and the position computation unit obtains the pieces of light spot position information from the light source unit.

4. The optical touch apparatus according to claim 2, wherein the optical signal processing unit obtains a piece of laser spot information according to each of the pieces of reflected light information and correspondingly obtains the vibration wave information in each of the pieces of optical analysis information through analyzing the laser spot information.

5. The optical touch apparatus according to claim 4, wherein the laser spot information comprises a period, a wavelength, an amplitude, a frequency, a phase, or a combination thereof of a laser spot corresponding to each of the laser beams.

6. The optical touch apparatus according to claim 1, wherein the optical signal processing unit further analyzes the pieces of reflected light information to obtain the pieces of light spot position information, and the position computation unit obtains the pieces of light spot position information from the optical signal processing unit.

7. The optical touch apparatus according to claim 1, wherein the light source unit is an optical modulation unit that correspondingly emits modulation signal light beams to generate the three reference light spots and each of the pieces of reflected light information is a piece of modulated reflected light information.

8. The optical touch apparatus according to claim 7, wherein the optical signal processing unit demodulates the pieces of modulated reflected light information according to a Fourier transformation, to generate the pieces of optical analysis information.

9. The optical touch apparatus according to claim 1, wherein
the light source unit emits another light beam to further generate an auxiliary light spot,
the auxiliary light spot and the reference light spots are respectively located at different positions,
the optical signal processing unit receives a piece of auxiliary reflected light information reflected and propagated by the auxiliary light spot and analyzes the piece of auxiliary reflected light information to correspondingly generate a piece of auxiliary optical analysis information,
the piece of auxiliary optical analysis information comprises the piece of vibration wave information and a piece of time point information, the piece of time point information refers to a time point at which the touch vibration wave is propagated to reach the auxiliary light spot, and
the position computation unit obtains a piece of position information of the auxiliary light spot and computes the touch position information according to the piece of auxiliary optical analysis information and the position information.

* * * * *